United States Patent
Zhang et al.

(10) Patent No.: US 11,594,952 B2
(45) Date of Patent: Feb. 28, 2023

(54) AUXILIARY POWER SUPPLY DEVICE FOR INVERTER, INVERTER, AND METHOD FOR STARTING THE SAME

(71) Applicant: Delta Electronics (Shanghai) Co., Ltd., Shanghai (CN)

(72) Inventors: Chao Zhang, Shanghai (CN); Wei Guan, Shanghai (CN); Hongyang Wu, Shanghai (CN); Feiqin Hao, Shanghai (CN); Fayang Jiang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 15 days.

(21) Appl. No.: 17/444,833

(22) Filed: Aug. 11, 2021

(65) Prior Publication Data

US 2022/0131458 A1   Apr. 28, 2022

(30) Foreign Application Priority Data

Oct. 23, 2020   (CN) .......................... 202011148894.0

(51) Int. Cl.
| | |
|---|---|
| H02M 1/36 | (2007.01) |
| H02M 7/219 | (2006.01) |
| H02M 1/00 | (2006.01) |
| H02M 7/797 | (2006.01) |

(52) U.S. Cl.
CPC ........... H02M 1/36 (2013.01); H02M 1/0006 (2021.05); H02M 7/219 (2013.01); H02M 7/797 (2013.01)

(58) Field of Classification Search
CPC ...... H02M 1/36; H02M 1/0006; H02M 7/219; H02M 7/797
See application file for complete search history.

(56) References Cited

U.S. PATENT DOCUMENTS

| | | | | |
|---|---|---|---|---|
| 9,093,919 | B2 * | 7/2015 | Chapman | ................. H02M 1/12 |
| 2012/0019070 | A1 * | 1/2012 | Matsuoka | ................. G06F 1/30 |
| | | | | 307/64 |
| 2014/0293665 | A1 * | 10/2014 | Hart | ........................ H02M 1/32 |
| | | | | 363/49 |
| 2018/0083527 | A1 * | 3/2018 | Fukuda | .................... H02M 1/36 |

FOREIGN PATENT DOCUMENTS

| | | |
|---|---|---|
| CN | 103532161 A | 1/2014 |
| CN | 203951383 U | 11/2014 |

* cited by examiner

*Primary Examiner* — Jue Zhang
(74) *Attorney, Agent, or Firm* — CKC & Partners Co., LLC

(57) ABSTRACT

An auxiliary power supply device for an inverter with a plurality of power modules connected in parallel is disclosed. The auxiliary power supply device includes: a plurality of soft-start circuits, each coupled to a DC port of a corresponding power module; a plurality of distributed auxiliary power supplies, each having an input terminal coupled to the DC port of the corresponding power module; and a centralized auxiliary power supply having an input terminal coupled to an AC side of the inverter, and an output terminal coupled to a DC side of the inverter. By replacing auxiliary power supplies on the AC sides of all power modules with the centralized auxiliary power supply and omitting soft-start circuits on the AC sides of all power modules, the present invention improves system performance in cost, volume, loss, and electromagnetic compatibility.

19 Claims, 6 Drawing Sheets

AUXILIARY POWER SUPPLY DEVICE FOR INVERTER, INVERTER, AND METHOD FOR STARTING THE SAME

CROSS-REFERENCE TO RELATED APPLICATIONS

This non-provisional application claims priority under 35 U.S.C. § 119(a) on Patent Application No. 202011148894.0 filed in P.R. China on Oct. 23, 2020, the entire contents of which are hereby incorporated by reference.

Some references, if any, which may include patents, patent applications, and various publications, may be cited and discussed in the description of this invention. The citation and/or discussion of such references, if any, is provided merely to clarify the description of the present invention and is not an admission that any such reference is "prior art" to the invention described herein. All references listed, cited, and/or discussed in this specification are incorporated herein by reference in their entireties and to the same extent as if each reference was individually incorporated by reference.

BACKGROUND OF THE INVENTION

1. Field of the Invention

The invention relates to the field of inverters, and particularly to an auxiliary power supply device for an inverter, an inverter, and a method for starting the same.

2. Related Art

A storage inverter system includes a bi-directional storage inverter and an energy storage medium (such as a power battery) and enables a more intelligent and stable micro-grid. As shown in FIG. 1, the storage inverter operates in a grid-connected mode, with its AC side being coupled to a grid through an AC panel and its DC side being coupled to a battery through a DC panel, to enable a bi-directional flow of energy. Positions and structures of the AC panel and the DC panel can be arranged according to actual situations. For example, the AC panel and the DC panel may be omitted. In the grid-connected mode, the storage inverter may work with new energy equipment to smooth intermittent output of new energy and promote the quality of electric energy and reliability of the grid. For occasions with peak load, the storage inverter can realize load balance and peak-cut, thereby reducing investment of grid and electric charge. In addition, the storage inverter may conduct inactive power control and grid frequency regulation to improve the quality of the grid.

As shown in FIG. 2, the storage inverter operates in a standalone mode, with its AC side being coupled to a local load through an AC panel and its DC side being coupled to a battery through a DC panel. The position and structure of the AC panel can be configured according to actual situations. In some situations, the AC panel may be omitted. The storage inverter converts electric energy in the battery into AC energy and transmits the AC energy to the AC side for supplying power to the local load on the AC side.

As shown in FIG. 3, the storage inverter operates in a DC voltage source mode, with its AC side being coupled to a grid through an AC panel and its DC side being coupled to at least one DC converter through a DC panel, to enable a bi-directional flow of energy. The DC converter may be a PV adapter, a DC charger, and the like, and the position and structure of the AC panel may be arranged according to actual situations. In some situations, the AC panel and the DC panel may be omitted. The storage inverter operates in the DC voltage source mode as rectifier equipment to provide a DC voltage for supplying energy to loads on the DC side.

Generally, the storage inverter includes a plurality of power modules connected in parallel to improve the power level. FIG. 4 illustrates a circuit diagram of a power module in a conventional inverter. As shown in FIG. 4, to satisfy the three modes in FIGS. 1-3 simultaneously, the power module is provided internally with an AC isolated auxiliary power supply 3, a DC isolated auxiliary power supply 4, an AC start circuit 1 corresponding to the AC isolated auxiliary power supply 3, and a DC start circuit 2 corresponding to the DC isolated auxiliary power supply 4. The AC start circuit 1 includes an AC main switch and an AC soft-start circuit, and the DC start circuit 2 includes a DC main switch and a DC soft-start circuit. A primary side of the AC isolated auxiliary power supply 3 is coupled to an AC port of the power module, a primary side of the DC isolated auxiliary power supply 4 is coupled to a DC port of the power module, and secondary sides of the AC isolated auxiliary power supply 3 and the DC isolated auxiliary power supply 4 are connected in parallel for supplying power to auxiliary circuits such as a control board and a relay inside the module. Wherein, in the grid-connected mode, the grid-connected inverter need to meet some safety requirements, for example, the DC side and the AC side of the inverter shall be substantially isolated from each other under a single failure. The auxiliary power supplies inside the power module on the AC port and the DC port shall also meet the above requirements, so the two auxiliary power supplies equipped at the AC port and the DC port are both high-voltage isolated power supplies for converting a high-voltage into a low-voltage. However, the high-voltage isolated power supply has a large volume and is complicated in a circuit structure.

The power module is equipped internally with two high-voltage isolated power supplies, such that the power module can be started from the AC port or the DC port. That is, both the DC side and the AC side of the bi-directional storage inverter are equipped with auxiliary power supplies, such that an inverter system can be started from the DC side or the AC side, to realize the three working modes shown in FIGS. 1-3. Referring to FIGS. 1 and 4, in the grid-connected mode, the AC port (R, S, T) of the power module is coupled to the grid and the DC port (DC+, DC−) is coupled to the battery, the grid supplies power to the AC isolated auxiliary power supply 3 inside the power module, and the AC soft-start circuit is turned on, to realize starting the power module from the AC port. Alternatively, the battery supplies power to the DC isolated auxiliary power supply 4 inside the power module, and the DC soft-start circuit is turned on, to realize starting the power module from the DC port. Referring to FIGS. 2 and 4, in the standalone mode, the AC port (R, S, T) of the power module is coupled to the load, the DC port (DC+, DC−) is coupled to the battery, the battery supplies power to the DC isolated auxiliary power supply 4 inside the power module, and the DC soft-start circuit is turned on, to realize starting the power module from the DC ports. Referring to FIGS. 3 and 4, in the DC voltage source mode, the AC port (R, S, T) of the power module is coupled to the grid, the DC port (DC+, DC−) is coupled to the DC converter, the grid supplies power to the AC isolated auxiliary power supply 3 inside the power module, and the AC soft-start circuit is turned on, to realize starting the power module from the AC port.

The conventional solutions can realize grid-connected, standalone, and DC voltage source modes, and substantial insulation between the DC port and the AC grid. But the power module is arranged internally with two high-voltage isolated auxiliary power supplies and two soft-start circuits, which improves the overall cost and complexity of the inverter system. Moreover, as the inverter system tends to a high voltage, it is difficult to select AC relays that satisfy substantial insulation in the AC start circuit, and the cost for the AC relays is high. With the increase of the power levels, the deficiencies become prominent. Taking an inverter system with ten power modules connected in parallel as an example, at least ten AC isolated auxiliary power supplies 3, ten DC isolated auxiliary power supplies 4, ten AC start circuits (including soft-start circuits) and ten DC start circuits (including soft-start circuits) are demanded. Two high-voltage isolating power supplies and two soft-start circuits in the power module greatly limit optimization of the inverter in terms of cost, volume and loss, and undermine the competitiveness of the products.

Therefore, there is a need to find an auxiliary power supply device for an inverter, an inverter, and a method for starting the same having a low cost and a small volume while realizing various working modes.

SUMMARY OF THE INVENTION

In view of these, an object of the invention is to provide an auxiliary power supply device for an inverter, which starts a power supply in a DC voltage source mode through a centralized auxiliary power supply and improves cost, volume, loss, and electromagnetic compatibility of the overall system.

To realize the above object, the invention provides an auxiliary power supply device for an inverter with a plurality of power modules connected in parallel, wherein the auxiliary power supply device comprises a plurality of soft-start circuits, each coupled between DC port of the corresponding power module and a conversion circuit; a plurality of distributed auxiliary power supplies, each having an input terminal coupled between the DC port of the corresponding power module and the soft-start circuit; and a centralized auxiliary power supply having an input terminal coupled to an AC side of the inverter, and an output terminal coupled to a DC side of the inverter.

The invention further provides an inverter. The inverter comprises: a plurality of power modules having AC ports coupled in parallel to form an AC side of the inverter, and DC ports coupled in parallel to form a DC side of the inverter; a centralized auxiliary power supply having an input terminal coupled to the AC side of the inverter, and an output terminal coupled to the DC side of the inverter. Wherein each of the power modules comprises a soft-start circuit coupled to the DC ports of the power modules; and a distributed auxiliary power supply having an input terminal coupled between the soft-start circuit and the DC ports of the power modules.

The invention further provides a method for starting an inverter, wherein the inverter comprises n power modules connected in parallel; and a centralized auxiliary power supply having an input terminal coupled to an AC side of the inverter, and an output terminal coupled to a DC side of the inverter; wherein each of the power modules comprises: a soft-start circuit coupled to DC ports of the power module; and a distributed auxiliary power supply having an input terminal coupled between the soft-start circuit and the DC ports of the power module. Wherein, the method comprises: establishing a voltage on the DC side of the inverter for supplying power to the distributed auxiliary power supplies; turning on the soft-start circuits of the n power modules, and establishing a voltage on the AC side of the n power modules; and turning on a main switch on the AC side of the n power modules.

Hereinafter the explanations are described in detail with reference to the embodiments, and further interpretations are provided to the technical solution of the invention.

BRIEF DESCRIPTION OF THE DRAWINGS

To make the above and other objects, features, advantages, and examples of the invention more apparent, the accompanying drawings are explained as follows.

DETAILED EMBODIMENTS OF THE INVENTION

Figure 1:
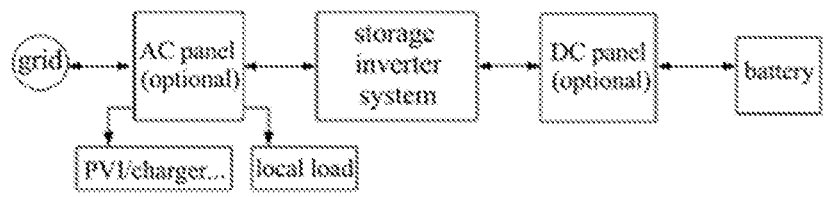
FIG. 1 is a circuit diagram of a storage inverter operating in a grid-connected mode in the prior art.
Figure 2:
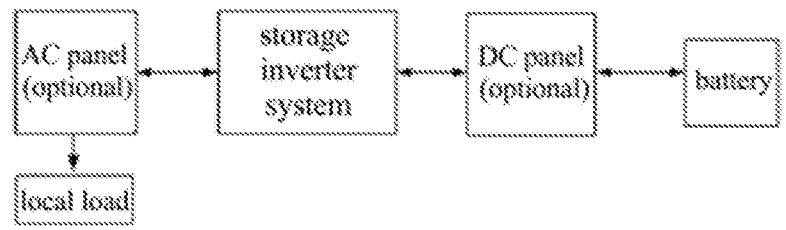
FIG. 2 is a circuit diagram of a storage inverter operating in a standalone mode in the prior art.
Figure 3:
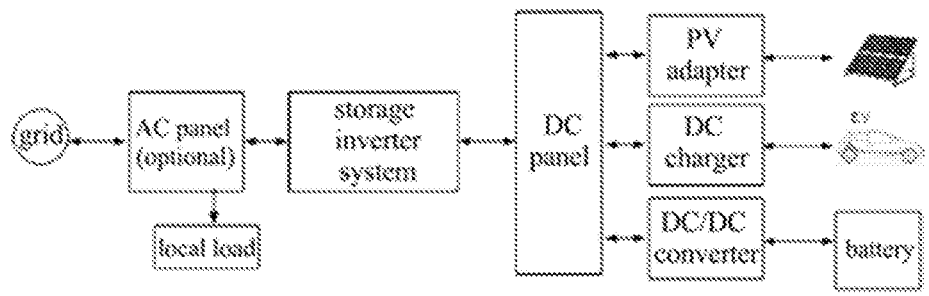
FIG. 3 is a circuit diagram of a storage inverter operating in a DC voltage source mode in the prior art.
Figure 4:
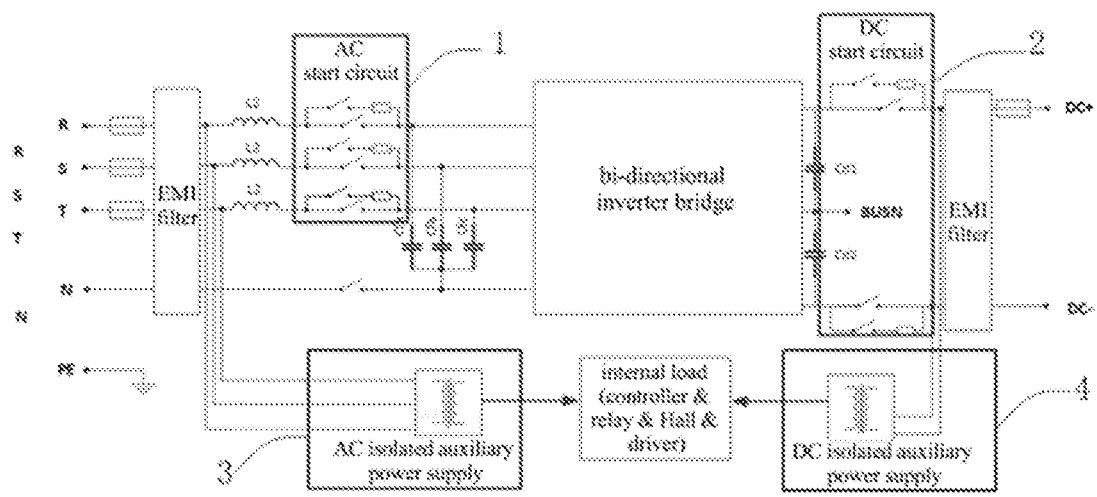
FIG. 4 illustrates a schematic diagram of an internal structure of a power module of the storage inverter in the prior art.

To make the invention more thorough and complete, the accompanying drawings and the various embodiments shall be referred to, and the same numbers in the drawings represent the same or similar components. On the other hand, the commonly known components and steps are not described in the examples to avoid unnecessary limits to the invention. In addition, for the sake of simplicity, some known customary structures and elements are illustrated in a simple way in the drawings.

The invention provides an auxiliary power supply device for an inverter, which may be a storage inverter, such as, a bi-directional storage inverter for bi-directional flow of energy. The inverter comprises a plurality of power modules connected in parallel, and the auxiliary power supply device. Based on the intended function, the auxiliary power supply device comprises auxiliary loops and auxiliary power supplies, wherein the auxiliary power supplies supply power to controllers, relays, and drivers within the plurality of power modules, and the auxiliary loops correspond to soft-start circuits inside the power modules and are controlled by the controllers within the power modules, thereby realizing soft-start of the power modules.

Specifically, the auxiliary power supply device comprises a plurality of soft-start circuits, each being coupled between a DC port of the corresponding power module and a conversion circuit; a plurality of distributed auxiliary power supplies, each having an input terminal coupled between the DC port of the corresponding power module and the soft-start circuit; and a centralized auxiliary power supply having an input terminal coupled to an AC side of the inverter, and an output terminal coupled to a DC side of the inverter. Hereinafter the inverter and the auxiliary power supply device of the invention are explained with reference to the detailed embodiments and the drawings.

Figure 5:
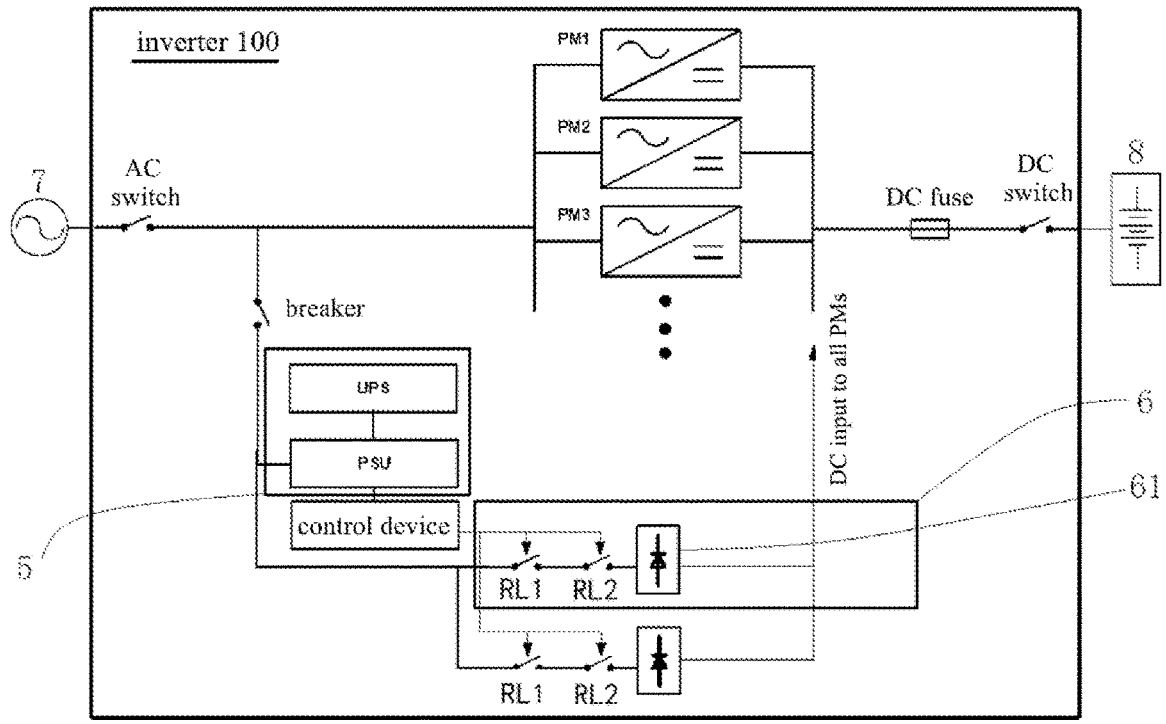
FIG. 5 illustrates a circuit diagram of a storage inverter in a grid-connected operating mode according to one embodiment of the invention.

FIG. 5 illustrates a circuit diagram of a storage inverter according to one embodiment of the invention. As shown in FIG. 5, the storage inverter (hereinafter referred to as the inverter) 100 includes a plurality of power modules PM1, PM2, PM3 . . . connected in parallel, wherein AC ports of the plurality of power modules are coupled in parallel to form an AC side of the inverter 100 and DC ports of the plurality of power modules are coupled in parallel to form a DC side of the inverter 100. Alternatively, an AC bus comprises multiple groups of AC terminals, and the three-phase AC port of each power module is correspondingly attached to one group of three-phase AC terminals of the AC bus; a DC bus comprises multiple groups of DC terminals, and the DC port of each power module is correspondingly attached to one group of DC terminals of the DC bus. The AC side is coupled to a grid 7 through an AC switch, the DC side is coupled to an energy storage device, i.e., a battery 8, through a DC fuse and a DC switch. The inverter 100 is working in a grid-connected mode, such that the grid charges the battery, or the battery is discharged to the grid. The AC switch, a breaker, the DC switch, and the DC fuse serve as distribution protection devices.

The inverter 100 includes a system auxiliary power supply 5. The system auxiliary power supply 5 is coupled to the AC switch and the AC side of the inverter via the breaker to supply power to a control device of the inverter, such as a system controller, and the system auxiliary power supply 5 is configured to start the battery 8 (or other energy storage medium) through the system controller in a grid-connected or standalone mode. The system auxiliary power supply 5 comprises an uninterrupted power supply (UPS) and a power supply unit (PSU), wherein an input of the PSU is coupled to the grid and the UPS and an output of the PSU is coupled to the control device. The AC switch and the breaker remain on, the grid supplies input energy to the PSU, and the PSU converts a grid voltage into a low DC voltage to supply power for the control device. When the grid has a failure, or the inverter 100 is offline, the AC switch and the breaker are turned off, and the UPS supplies the energy to the PSU for supplying power to the control device continuously.

The inverter 100 further includes a centralized auxiliary power supply 6 having an input terminal coupled to the AC side of the inverter 100, and an output terminal coupled to the DC side of the inverter 100. Alternatively, the DC bus further comprises one group of DC terminals electrically connected to the output terminal of the centralized auxiliary power supply 6. Generally, the capacity of the centralized auxiliary power supply 6 is far less than the capacity of the power modules. In some embodiments, the output terminal of the centralized auxiliary power supply 6 and the DC terminals of the DC bus can be electrically connected by leads or other connection elements, and the invention is not limited thereto. The input terminal of the centralized auxiliary power supply 6 is coupled to the AC switch and the AC side of the inverter via the breaker, and the output terminal of the centralized auxiliary power supply 6 is sequentially coupled to the DC fuse and the DC side of the inverter 100.

Figure 6:
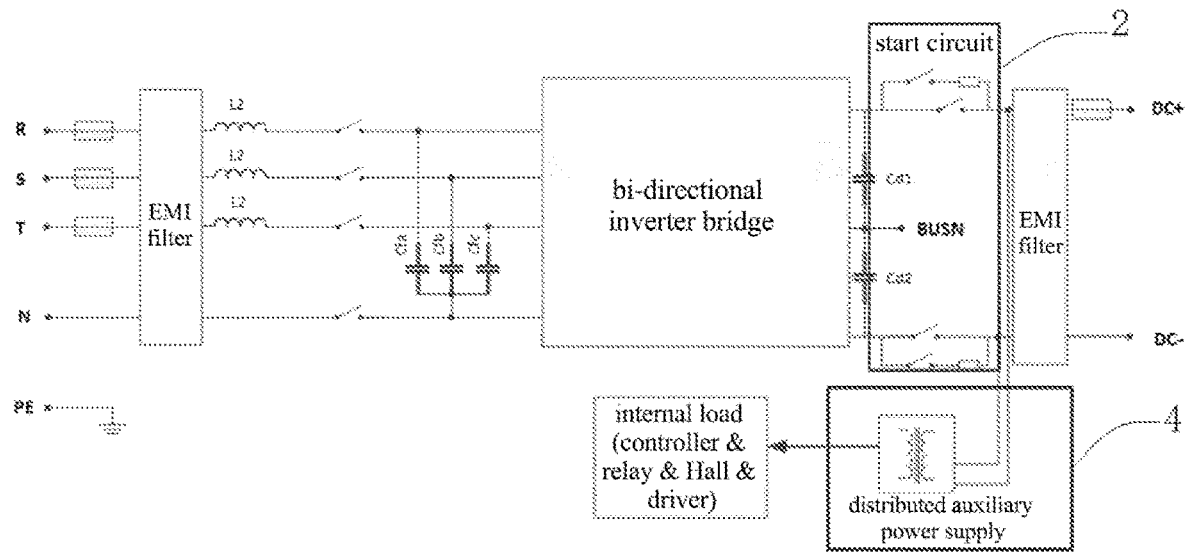
FIG. 6 illustrates a schematic diagram of an internal structure of a power module of the storage inverter according to one embodiment of the invention.

Hereinafter taking the power module PM1 as an example, an internal structure is further described in detail. As shown in FIG. 6, the power module is provided internally with a start circuit 2 and a distributed auxiliary power supply 4. A conversion circuit of the power module PM1 includes a bi-directional inverter bridge and a DC bus. The DC bus includes a positive DC bus, a negative DC bus, and bus capacitors. The positive DC bus is coupled to a positive DC terminal DC+, the negative DC bus is coupled to a negative DC terminal DC−, and the bus capacitors Cd1 and Cd2 are connected in series with a common connection point being a DC bus middle node BUSN. The start circuit 2 is coupled between the DC terminals (DC+, DC−) of the power module PM1 and the conversion circuit. Further, the start circuit 2 is coupled in series between the DC terminals (DC+, DC−) and the conversion circuit. The start circuit 2 includes DC main switches and soft-start circuits, which are all coupled between the DC terminals (DC+, DC−) and the conversion circuit respectively. The DC main switches include two groups, and the soft-start circuits include two groups. One group of DC main switches is connected in parallel to one group of soft-start circuits, which are coupled in series between the DC terminal DC+ and the conversion circuit. Another group of DC main switches is connected in parallel to another group of soft-start circuits, which are coupled in series between the DC terminal DC− and the conversion circuit. The DC main switches may be relays and often referred to as DC main relays, which may be selected based on the capacity of the power modules and a rated current of which is generally within a range of 200 A to 400 A. The soft-start circuit is DC soft-start circuit and includes a switch and a resistor connected in series. The switch may be relay, and often referred to a DC preload relay, a rated current of which is generally within a range of 20 A to 50 A to establish a DC bus voltage slowly. An input terminal of the distributed auxiliary power supply 4 is coupled between the start circuit 2 and the DC port of the power module PM1, and the input terminal of the distributed auxiliary power supply 4 is connected in parallel to the DC port of the power module PM1. An output terminal of the distributed auxiliary power supply 4 is coupled to an internal load. The internal load includes a controller board, a relay, a hall sensor, or a driver. In this embodiment, the DC port of the power module PM1 is further provided with an EMI filter.

In some embodiments, the start circuit 2, for example, is a DC start circuit, and the distributed auxiliary power supply 4, for example, is a DC isolated auxiliary power supply. As shown in FIG. 6, it is unnecessary to provide an AC isolated auxiliary power supply at the AC port of the power module PM1. The start circuit at the corresponding AC port only comprises AC main switches without the AC soft-start circuits, wherein the AC main switches may be large capacity contactors or relays. In the power module PM1, L1, L2, L3 are AC filter inductors, Cfa, Cfb, Cfc are AC filter capacitors, the bi-directional inverter bridge is a main topology of the conversion circuit, and the internal load is a powering object of the auxiliary power supply. Structures of other power modules PM2, PM3 . . . are the same as that of the power module PM1.

Referring to FIGS. 5 and 6, the plurality of DC soft-start circuits, the plurality of distributed auxiliary power supplies 4 and the centralized auxiliary power supply 6 serve as the auxiliary power supply device for the inverter 100, to realize reliable start and stable operation of the plurality of power modules. The output terminal of the centralized auxiliary power supply 6 is substantially coupled to DC ports of the plurality of power modules. For example, the output terminal of the centralized auxiliary power supply 6 is electrically connected to the DC bus on the DC side of the inverter 100 through leads, and DC+ and DC− of the plurality of power modules are electrically connected to the DC bus on the DC side of the inverter 100 through a bus, thereby realizing the parallel connection.

As compared to the prior art, the AC soft-start circuits and the AC isolated auxiliary power supplies are omitted inside the power module PM of the invention, such that only the DC soft-start circuits and the DC auxiliary power supplies are needed. If the inverter comprises n power modules PM1, PM2, PM3 . . . , PMn connected in parallel, the auxiliary power supply device of the invention correspondingly includes n DC soft-start circuits, n distributed auxiliary power supplies 4 and one centralized auxiliary power supply 6, i.e. 2n+1 necessary structures in total. However, the auxiliary power supply device of the conventional inverter requires at least n AC soft-start circuits, n AC isolated auxiliary power supplies, n DC soft-start circuits and n DC isolated auxiliary power supplies, i.e. at least 4n necessary structures in total. Obviously, the inverter system in the present invention is remarkably improved in aspects of volume, structure, and cost. Further, with increasing power levels, an optimized structure of the auxiliary power supplies with modules connected in parallel as proposed in the present invention is more advantageous.

As shown in FIG. 5, the centralized auxiliary power supply 6 includes a switching circuit having a first port coupled to the AC side of the inverter; and a rectifier circuit having a first port coupled to a second port of the switching circuit, and a second port coupled to the DC side of the inverter. The switching circuit further includes a control port coupled to a control device of the inverter 100, such that the switching circuit is controlled by the control device. For example, the control device may be a system controller. In some embodiments, the switching circuit includes relays. Further, the switching circuit includes a first AC relay RL1 and a second AC relay RL2 connected in series, and the two relays can realize redundant isolation. A control port of the first AC relay RL1 and a control port of the second AC relay RL2 are both coupled to the control device. The rectifier circuit includes a three-phase rectifier bridge 61.

The auxiliary power supply device may also include a backup centralized auxiliary power supply redundant with the centralized auxiliary power supply 6. The backup centralized auxiliary power supply may have the same structure as the centralized auxiliary power supply 6. The main structure of the centralized auxiliary power supply is miniature relays and a rectifier bridge, so the cost is low, and the structure is simple.

Referring to FIGS. 5 and 6, the inverter 100 operates in a grid-connected mode, with its AC side being coupled to a grid 7 and its DC side being coupled to a battery 8, to enable a bi-directional flow of energy. Since the power module has only DC isolated auxiliary power supply and DC soft-start circuits internally, the power module can be started from the DC port only. The battery 8 supplies power to the distributed auxiliary power supply 4 inside each of the power modules, and the distributed auxiliary power supply 4 converts voltage of the battery 8 into a low-voltage DC power supply (such as 12V, 5V, etc.) for supplying power to the internal load. ID assignment is performed among the power modules to determine the power modules to be started. When the DC soft-start circuits inside the power modules are turned on, the battery 8 charges the bus capacitors Cd1 and Cd2 in each of the power modules to supply the energy for starting the power modules. The bi-directional inverter bridge converts the electric energy of the bus capacitors into AC energy for charging the capacitors Cfa, Cfb, and Cfc on the AC side, and the AC main switch is turned on to complete the start of the power module. All power modules are started sequentially till the inverter completes start.

When the AC side of the inverter is coupled to the energy storage element, the centralized auxiliary power supply 6 does not work, i.e., the switching circuit is open. The energy storage element may be any energy storage mediums, such as a battery, a super capacitor, and the like.

Figure 7:
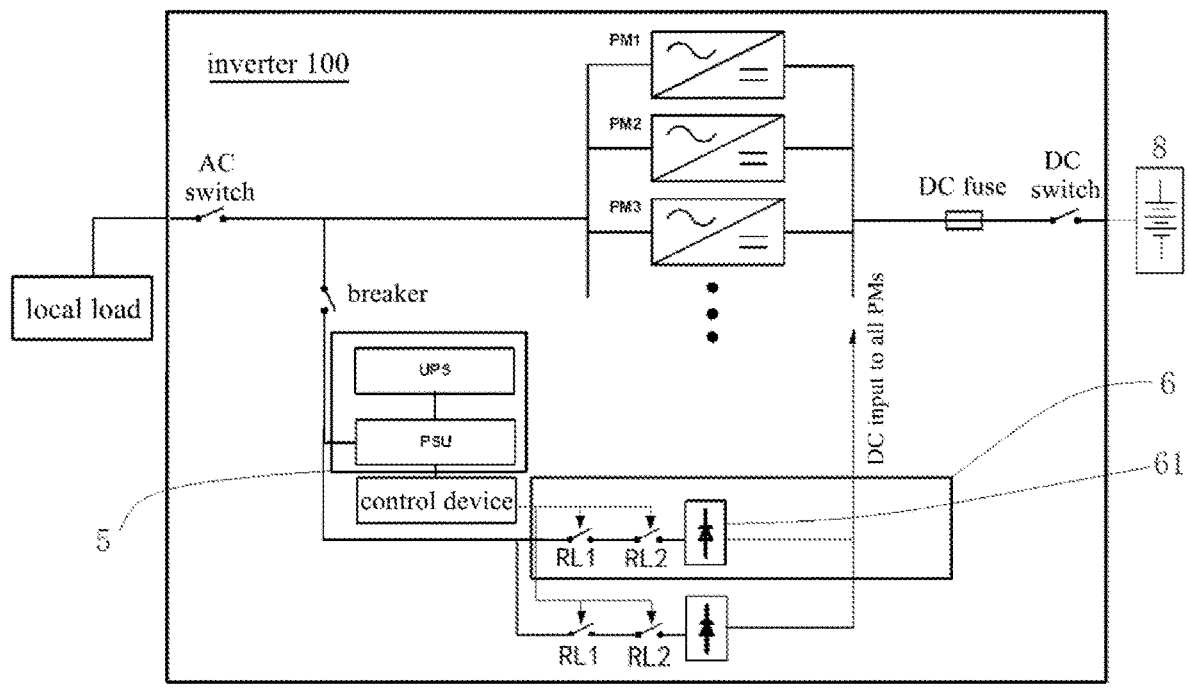
FIG. 7 illustrates a circuit diagram of a storage inverter in a standalone operating mode according to one embodiment of the invention.

FIG. 7 illustrates a circuit diagram of a storage inverter according to second embodiment of the invention, which differs from the first embodiment. In this embodiment, the inverter 100 operates in a standalone mode with its AC side being coupled to a load, and a battery supplies power to the load. As for others, which is substantially same with first embodiment and the details are not described here.

Figure 8:
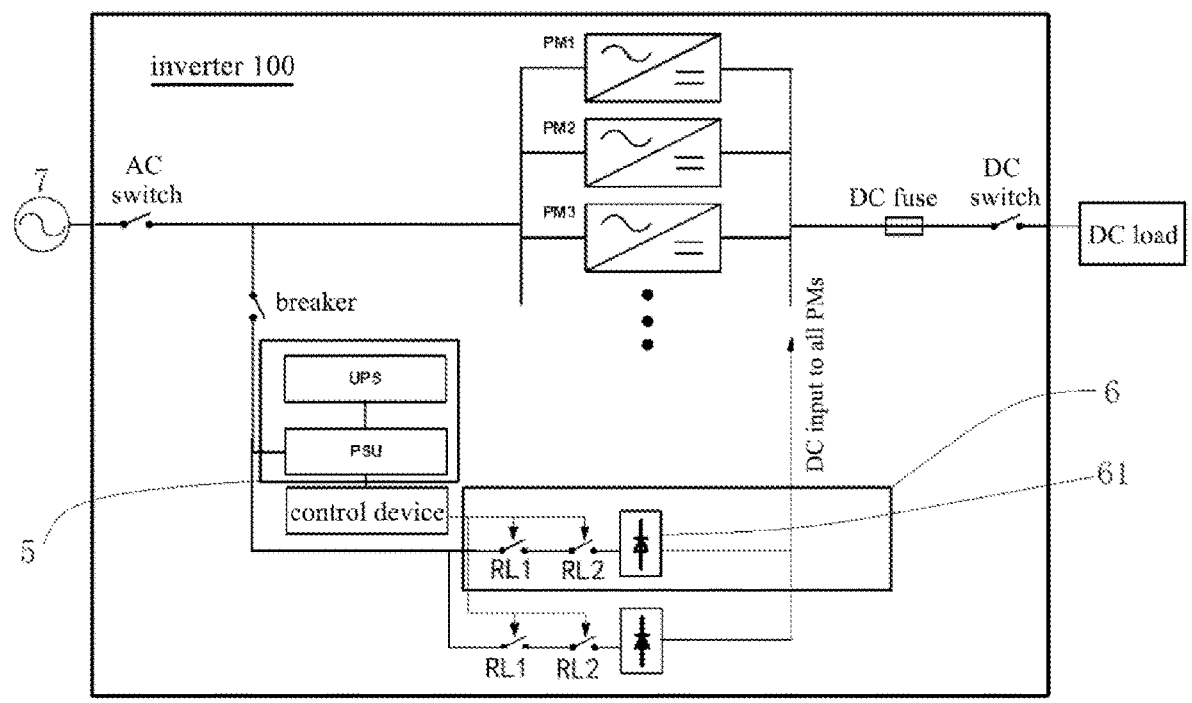
FIG. 8 illustrates a circuit diagram of a storage inverter in a DC voltage source mode according to one embodiment of the invention.

FIG. 8 illustrates a circuit diagram of a storage inverter according to third embodiment of the invention. The third embodiment differs from the first embodiment in that the inverter 100 operates in a DC voltage source mode with its DC side being coupled to an energy consumption element, such as a DC load. The DC load may be, but not limited to, a DC converter, such as a buck converter, a boost converter, a buck-boost converter, a buck+boost converter, a flyback converter, a forward converter, a Cuk converter, a charge pump, or other types of the converter.

Since the power module has only DC isolated auxiliary power supplies and DC soft-start circuits internally, the power module can be started from the DC port only. In this embodiment, the DC side of the inverter 100 does not have an energy source, and the DC energy for starting the power modules is supplied by the centralized auxiliary power supply. When the inverter is started, the centralized auxiliary power supply 6 is enabled to supply power to the distributed auxiliary power supply 4 of each of the power modules. The distributed auxiliary power supplies 4 convert input voltage supplied by the centralized auxiliary power supply 6 into a low DC voltage (such as 12V, 5V, etc.) for supplying power to the internal load. The system controller or upper computer determines the power module (such as the ith power module, where i=1, 2, 3 . . . ) to be initially started, and sets the ith power module as a main power module, so the soft-start circuit inside the ith power module is turned on. Taking the first power module PM1 to be initially started as an example, after the soft-start circuit inside the power module PM1 is turned on, output electric energy of the centralized auxiliary power supply 6 charges the bus capacitors Cd1 and Cd2 of the power module PM1, and the bi-directional inverter bridge converts electric energy of the bus capacitors into AC electric energy for charging the capacitors Cfa, Cfb and Cfc on the AC side, then the AC main switch is turned on, so the start of the power module PM1 is completed, and the centralized auxiliary power supply 6 stops working. The started power module PM1 performs PWM rectification on the input electric energy of the grid to output a DC voltage on the DC side of the inverter. The DC voltage charges DC bus capacitors of other power modules PM2, PM3 . . . , and supplies start energy for other power modules. All power modules are started sequentially till the inverter completes start.

Generally, electricity supplied by the centralized auxiliary power supply 6 is less than the start energy desired by the plurality of power modules. The centralized auxiliary power supply 6 only supplies the start power for partial power modules and distributed auxiliary power supplies. In this embodiment, taking ten power modules as an example, the centralized auxiliary power supply 6 supplies open-loop no-load operating energy for one power module (such as PM1) and energy for the distributed auxiliary power supplies in the ten power modules, such that volume and cost of the centralized auxiliary power supply 6 are optimal. For example, as for one power module with 100 KW, rated power of the distributed auxiliary power supplies is 100 W, and a start power or an open-loop power for the power module is about 2 KW, so a rated power of the centralized auxiliary power supply 6 can be set to about 3 KW. The centralized auxiliary power supply 6 mainly includes a three-phase rectifier bridge, relays, and a radiator. The three-phase rectifier bridge mainly includes diode devices with low cost, and the relays have a small capacity (such as less than 3 KW in this embodiment), and are low cost. The cost of one centralized auxiliary power supply 6 is about one-fifth of n distributed auxiliary power supplies and n soft-start circuits on the AC side, and volume and structure complexity are also largely reduced. Moreover, the centralized auxiliary power supply does not need to work with high-frequency, so there is high reliability and excellent EMC performance. Therefore, the solution of the present invention has more advantages than n distributed auxiliary power supplies and n soft-start circuits on the AC side inside the n power modules of the conventional solution. In addition, the three-phase rectifier bridge in the centralized auxiliary power supply includes diodes, which is easier to select and control, compared with the AC distributed auxiliary power supplies and the AC soft-start circuits in the conventional solution. The auxiliary power supply device proposed in the present invention optimizes the inverter and is particularly adapted to architecture with a plurality of power modules connected in parallel.

In this embodiment, the inverter operates in the DC voltage source mode and inverts an input AC current into a DC current for supplying power to DC loads. When the inverter is started, the switching circuit of the centralized auxiliary power supply 6 is turned on, and the uncontrolled rectifier circuit converts an AC voltage into a first DC voltage, and inputs the first DC voltage to the DC side of the inverter for supplying power to the plurality of distributed auxiliary power supplies 4, and supplying start power to the at least one power module. After at least one power module is started, the switching circuit is turned off, and the centralized auxiliary power supply 6 stops working. The started power module converts the AC voltage into a second DC voltage (such as 750 to 1000V), and inputs the second DC voltage to the DC side of the inverter for supplying power to the plurality of distributed auxiliary power supplies 4, and supplying start power to other power modules. The centralized auxiliary power supply 6 has an electricity capacity far less than that of the power modules and has a small structure, low cost, and a simple structure.

In the grid-connected mode, if the battery is over-discharged, when the inverter is started, the battery on the DC side cannot be discharged, and it is impossible to establish the DC voltage, so the DC voltage shall be supplied by the centralized auxiliary power supply to complete start of the power module. For details, one can refer to second embodiment.

According to one embodiment of the invention, the inverter comprises n power modules PM1, PM2, PM3 . . . , PMn connected in parallel. The auxiliary power supply device includes n soft-start circuits, n distributed auxiliary power supplies 4, and one centralized auxiliary power supply 6. In some embodiments, the auxiliary power supply device includes n soft-start circuits, n distributed auxiliary power supplies 4, and two centralized auxiliary power supplies 6, wherein the two centralized auxiliary power supplies 6 are connected in parallel to form a redundant structure.

According to still another embodiment of the invention, as shown in FIG. 8, the DC side of the inverter is coupled to an energy consumption element, and when the inverter is started, the centralized auxiliary power supply 6 supplies power to the plurality of distributed auxiliary power supplies 4. As shown in FIG. 5, the DC side of the inverter is coupled to an energy storage element for supplying power to the plurality of distributed auxiliary power supplies 4.

According to even another embodiment of the invention, when the DC side of the inverter is coupled to an energy storage element, the switching circuit is open. When the DC side of the inverter is coupled to an energy consumption element and when the inverter is started, the switching circuit is turned on, and the rectifier circuit 61 converts an AC voltage into a DC voltage for supplying power to the plurality of distributed auxiliary power supplies 4.

Figure 9:
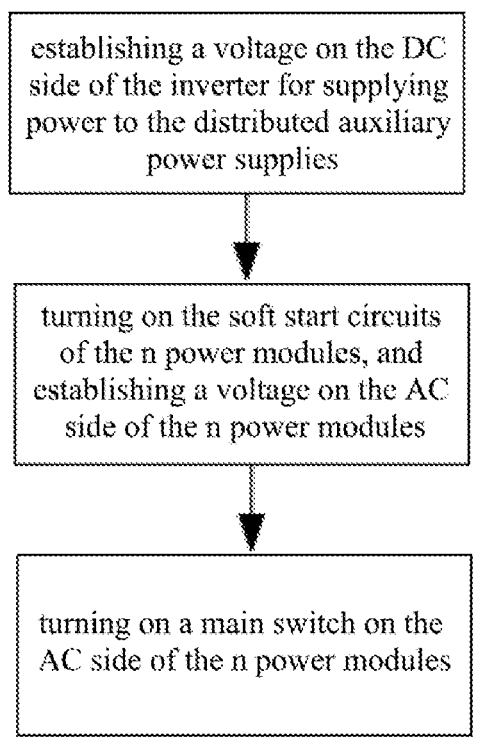
FIG. 9 illustrates a flow chart of a method for starting the storage inverter in a DC voltage source mode according to one embodiment of the invention.

FIG. 9 provides a method for starting an inverter, wherein the inverter includes n power modules connected in parallel; and a centralized auxiliary power supply 6 having an input terminal coupled to an AC side of the inverter, and an output terminal coupled to a DC side of the inverter. Each of the power modules includes: a start circuit 2 coupled in series to a DC port of the power module; and a distributed auxiliary power supply 4 having an input terminal coupled between the start circuit 2 and the DC port of the power module. The start circuit 2 includes a main switch and a soft-start circuit connected in parallel.

The method includes:

establishing a voltage on the DC side of the inverter for supplying power to the distributed auxiliary power supplies 4;

turning on the soft-start circuits of the n power modules, and establishing a voltage on the AC side of the n power modules; and turning on a main switch on the AC side of the n power modules.

According to still another embodiment of the invention, establishing a voltage on the DC side of the inverter includes determining whether the inverter operates in a DC voltage source mode and if yes, establishing the voltage on the DC side of the inverter through the centralized auxiliary power supply 6.

According to even another embodiment of the invention, when the inverter operates in the DC voltage source mode, the centralized auxiliary power supply 6 converts an AC input voltage into a first DC voltage, and provides the first DC voltage to the DC side of the inverter for supplying power to the distributed auxiliary power supplies 4 of the n power modules. And the method includes:

determining the power module to be initially started, for example, the ith power module, closing the soft-start circuit of the ith power module, and controlling the first DC voltage to charge a DC capacitor of the ith power module, wherein the ith power module converts a voltage of the DC capacitor into an AC voltage for charging an AC capacitor of the ith power module; turning on a main switch on the AC side of the ith power module when the soft-start of the ith power module is completed to allow the centralized auxiliary power supply 6 to stop working; wherein the ith power module converts the AC voltage into a second DC voltage and inputs the second DC voltage to the DC side of the inverter for supplying energy for other n−1 power modules to start.

It can be understood that the ith power module can be any one of the n power modules, such as the first power module, the fifth power module, or the like.

According to even another embodiment of the invention, taking the power module PM1 to be started firstly as an example, the method for starting the inverter may specifically include:

i. firstly, the system auxiliary power supply 5 works, and then the system controller begins to work and receives an instruction of the DC voltage source operating mode;

ii. the system controller controls the first relay RL1 and the second relay RL2 to be turned on (the two relays may realize redundant isolation), the rectifier bridge 61 outputs the first DC voltage to DC ports of the power modules PM1 to PMn, and the distributed auxiliary power supplies 4 of all power modules begin to work. Then, ID assignment is performed among the power modules to determine the power module PM1 to be firstly started, the DC soft-start circuit of the power module PM1 is controlled to be turned on, and the PM1 detects whether a voltage of the DC port is within a preset range, i.e., the PM1 detects whether a voltage of the DC port is an uncontrolled rectifier voltage;

iii. the soft-start circuit inside the power module PM1 works, and charges the DC bus capacitors;

iv. the power module PM1 locks a phase of the grid voltage to obtain an angle θ of the grid voltage on the AC side of the inverter;

v. the power module PM1 starts the bi-directional inverter bridge with open-loop for inverting the first DC voltage into an AC voltage for charging the AC CAP (Cfa/Cfb/Cfc);

vi. the start of the power module PM1 is completed after the AC relays are turned on, and PWM signals of the bi-directional inverter is blocked, the first relay RL1, and the second relay RL2 are turned off, and the rectifier bridge 61 stops working;

vii. the power module PM1 starts the DC voltage source mode to output the PWM signals to the bi-directional inverter bridge, controls operation of the bi-directional inverter bridge, rectifies the grid voltage to the second DC voltage, outputs the second DC voltage to the DC ports of the power modules PM1 to PMn, and establishes the DC voltage of all DC ports of the power modules PM1 to PMn.

According to even another embodiment of the invention, after the power module PM1 enters the DC voltage source mode, power modules PM2 to PMn are started, and taking PM2 as an example, the method includes:

i. the soft-start circuit inside the power module PM2 is turned on, and charges the DC bus capacitors;

ii. the power module PM2 locks the phase of the grid voltage to obtain an angle θ of the grid voltage on the AC side;

iii. the power module PM2 controls the bi-directional inverter bridge to start with open-loop for inverting the second DC voltage into an AC voltage for charging the AC CAP (Cfa/Cfb/Cfc);

iv. after turning on the AC relays in the main loop, the power module PM2 is switched from an open-loop mode to the DC voltage source mode.

The start of the power modules PM3 to PMn is similar to that of the power module PM2, and the details are not described here. The first DC voltage is an uncontrolled rectifier voltage, and the second DC voltage is an output voltage of the power module. Taking a 220V grid as an example, the first DC voltage is a line voltage peak of the uncontrolled rectifier voltage, and a value range is often set from 350 to 450V, thereby avoiding the influence of fluctuation of the grid. The value range of the second DC voltage is from 750 to 1000V.

The invention replaces auxiliary power supplies on the AC side of all power modules with the centralized auxiliary power supply. The power modules include DC auxiliary power supplies and DC soft-start circuits, so the cost and volume of the power modules are reduced. Moreover, the inverter of the invention can realize the grid-connected mode, the standalone mode, and the DC voltage source mode, and substantial insulation between the DC ports and AC grid. In the invention, the centralized auxiliary power supply includes relays and a rectifier bridge without a high-frequency switching device, so as to obtain high reliability and better electromagnetic compatibility, while reducing the loss of the auxiliary power supplies. Since the centralized auxiliary power supply is always in an off state when the inverter works normally, the loss is reduced, and the overall system is remarkably improved in aspects of cost, volume, loss, and electromagnetic compatibility.

Although the invention has been disclosed by the embodiments, the invention is not limited thereto, and any skilled in the art shall make various changes and modifications without departing from spirit and scope of the invention, so the protection scope of the invention shall be subjected to the scope defined by the appended claims.

What is claimed is:

1. An auxiliary power supply device for an inverter with a plurality of power modules connected in parallel, comprising:
   a plurality of soft-start circuits, each being coupled between DC port of a corresponding power module and a conversion circuit;
   a plurality of distributed auxiliary power supplies, each having an input terminal coupled between the DC port of the corresponding power module and the soft-start circuit; and
   a centralized auxiliary power supply having an input terminal coupled to an AC side of the inverter, and an output terminal coupled to a DC side of the inverter.

2. The auxiliary power supply device according to claim 1, wherein each of the power modules comprises one soft-start circuit and one distributed auxiliary power supply internally.

3. The auxiliary power supply device according to claim 1, wherein the centralized auxiliary power supply comprises:
   a switching circuit having a first terminal coupled to the AC side of the inverter; and
   a rectifier circuit having a first terminal coupled to a second terminal of the switching circuit and a second terminal coupled to the DC side of the inverter.

4. The auxiliary power supply device according to claim 3, wherein the switching circuit further comprises a control terminal coupled to a control device of the inverter, such that the switching circuit is controlled by the control device.

5. The auxiliary power supply device according to claim 3, wherein the switching circuit comprises a first AC relay and a second AC relay connected in series, and the rectifier circuit comprises a three-phase rectifier bridge.

6. The auxiliary power supply device according to claim 3, wherein when the DC side of the inverter is coupled to an energy storage element, and the switching circuit is turned off; or when the DC side of the inverter is coupled to an energy consumption element and the switching circuit is turned on when the inverter is started, so that the rectifier circuit converts an AC voltage into a DC voltage and inputs the DC voltage to the DC side of the inverter for supplying power to the plurality of distributed auxiliary power supplies.

7. The auxiliary power supply device according to claim 1, wherein the auxiliary power supply device further comprises a backup centralized auxiliary power supply redundant with the centralized auxiliary power supply.

8. The auxiliary power supply device according to claim 1, wherein the DC side of the inverter is coupled to an energy storage element for supplying power to the plurality of distributed auxiliary power supplies.

9. The auxiliary power supply device according to claim 1, wherein the DC side of the inverter is coupled to an energy consumption element, and wherein when the inverter is started, the centralized auxiliary power supply supplies power to the plurality of distributed auxiliary power supplies.

10. The auxiliary power supply device according to claim 1, wherein the inverter comprises n power modules connected in parallel, and wherein the auxiliary power supply device includes n soft-start circuits, n distributed auxiliary power supplies, and one centralized auxiliary power supply.

11. An inverter, comprising:
a plurality of power modules having AC ports coupled in parallel to form an AC side of the inverter and DC ports coupled in parallel to form a DC side of the inverter;
a centralized auxiliary power supply having an input terminal coupled to the AC side of the inverter and an output terminal coupled to the DC side of the inverter;
wherein each of the power modules comprises:
a soft-start circuit coupled to the DC ports of the power modules; and
a distributed auxiliary power supply having an input terminal coupled between the soft-start circuit and the DC ports of the power modules.

12. The inverter according to claim 11, wherein the centralized auxiliary power supply comprises:
a switching circuit having a first terminal coupled to the AC side of the inverter; and
a rectifying circuit having a first terminal coupled to a second terminal of the switching circuit and a second terminal coupled to the DC side of the inverter.

13. The inverter according to claim 12, wherein the switching circuit further comprises a control terminal coupled to a control device of the inverter, such that the switching circuit is controlled by the control device.

14. The inverter according to claim 12, wherein the switching circuit comprises a first AC relay and a second AC relay connected in series, and wherein the rectifier circuit comprises a three-phase rectifier bridge.

15. The inverter according to claim 12, when the DC side of the inverter is coupled to an energy consumption element, and when the inverter is started, the centralized auxiliary power supply supplies power to the plurality of distributed auxiliary power supplies; or when the DC side of the inverter is coupled to an energy storage element for supplying power to the plurality of distributed auxiliary power supplies.

16. The inverter according to claim 12, when the DC side of the inverter is coupled to an energy storage element, and the switching circuit is turned off; or when the DC side of the inverter is coupled to an energy consumption element and the switching circuit is turned on when the inverter is started, so that the rectifier circuit converts an AC voltage into a DC voltage for supplying power to the plurality of distributed auxiliary power supplies.

17. A method for starting an inverter, wherein the inverter comprises n power modules connected in parallel and a centralized auxiliary power supply having an input terminal coupled to an AC side of the inverter and an output terminal coupled to a DC side of the inverter; wherein each of the power modules comprises a soft-start circuit coupled to DC port of the power module and a distributed auxiliary power supply having an input terminal coupled between the soft-start circuit and the DC port of the power module;
the method comprising:
establishing a voltage on the DC side of the inverter for supplying power to the distributed auxiliary power supplies;
turning on the soft-start circuits of the n power modules, and establishing a voltage on the AC side of the n power modules; and
turning on a main switch on the AC side of the n power modules.

18. The method for starting an inverter according to claim 17, wherein establishing a voltage on the DC side of the inverter comprises: determining whether the inverter operates in a DC voltage source mode and if yes, establishing the voltage on the DC side of the inverter through the centralized auxiliary power supply.

19. The method for starting an inverter according to claim 18, wherein when the inverter operates in the DC voltage source mode, the centralized auxiliary power supply converts an AC voltage into a first DC voltage and inputs the first DC voltage to the DC side of the inverter for supplying power to the distributed auxiliary power supplies of the plurality of the power modules;
turning on the soft-start circuit of the ith power module, and controlling the first DC voltage to charge a DC capacitor of the ith power module, wherein the ith power module converts a voltage of the DC capacitor into an AC voltage for charging an AC capacitor of the ith power module;
turning on a main switch on the AC side of the ith power module, and completing soft-start of the ith power module to allow the centralized auxiliary power supply to stop working;
wherein the ith power module converts the AC voltage into a second DC voltage and inputs the second DC voltage to the DC side of the inverter for supplying energy for the start of other n−1 power modules.

* * * * *